Aug. 21, 1934.  E. WALDER  1,971,058
AUTOMATICALLY CONTROLLED ELECTRIC TOASTER
Filed July 27, 1932   2 Sheets-Sheet 1

INVENTOR.
Emil Walder
BY
Herbert S. Fairbanks
ATTORNEY.

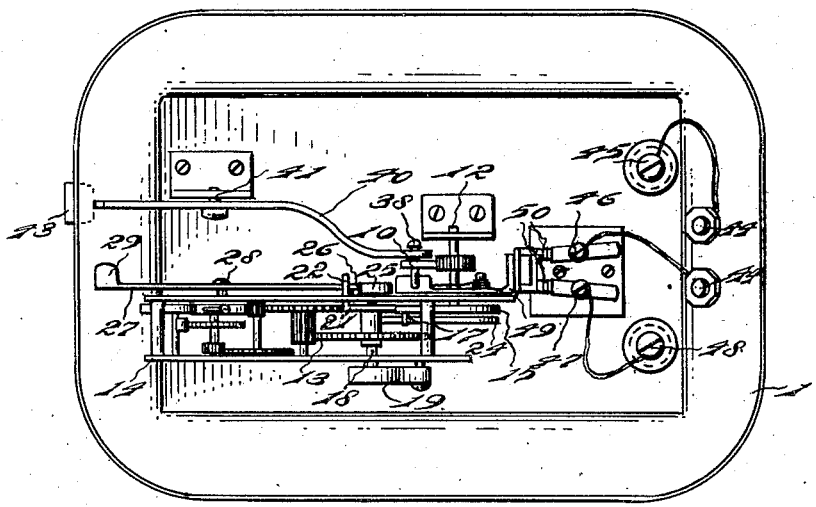
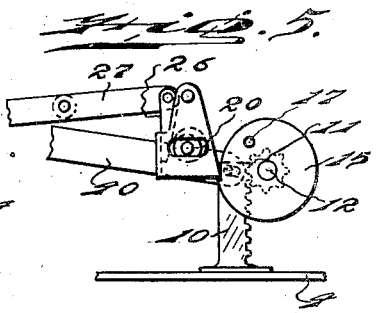
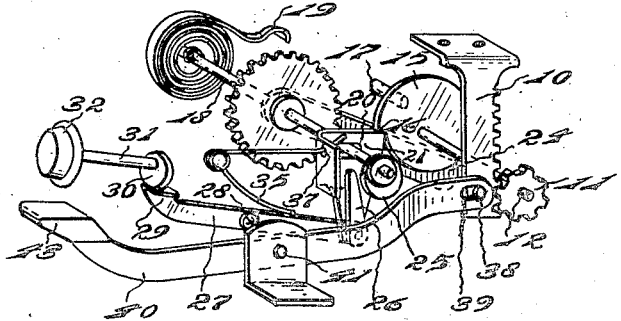
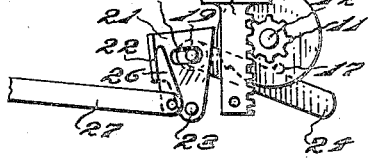

Patented Aug. 21, 1934

1,971,058

UNITED STATES PATENT OFFICE 1,971,058

AUTOMATICALLY CONTROLLED ELECTRIC TOASTER

Emil Walder, Philadelphia, Pa., assignor to National Stamping & Electric Works, Chicago, Ill., a corporation of Illinois Application July 27, 1932, Serial No. 624,973

14 Claims. (Cl. 219—19)

The object of this invention is to devise a novel construction and arrangement of an automatically controlled electric toaster wherein the toast, during the toasting operation, is concealed within the casing and wherein when the toasting operation is completed a movement of the casing is effective to expose the toast so that it can be readily grasped by the operator and removed from the toaster.

A further object of the invention is to devise novel automatic controlling mechanism which can be set to operate after a predetermined time interval has elapsed, in the form of a clock movement in which the main spring is automatically rewound when the toaster is reset for toasting.

A further object is to devise a novel construction of a sectional casing, the sections of which are relatively movable, a novel construction and arrangement of clock mechanism which can be manually set, and a novel construction and arrangement of a thermostatically controlled means to automatically control the clock mechanism.

With the above and other objects in view, as will hereinafter more clearly appear, my present invention comprehends a novel construction and arrangement of an automatically controlled electric toaster.

It further comprehends a novel electric toaster wherein the enclosing casing is movable relatively to its base to enclose the toast when the toasting action is taking place and to automatically move downwardly after the toasting action is completed to expose the toast so that it can be grasped by the operator and removed.

It further comprehends a novel electric toaster wherein a novel construction and arrangement of automatically controlled means is employed to control the movement of the casing, said means being in turn automatically controlled and regulated by means of an automatically actuated electric switch.

It further comprehends a novel construction and arrangement of a base and casing, novel manually actuated means for effecting relative movement of the casing and base to position the casing in toasting position, a novel construction and arrangement of a clock train mechanism to effect the release of said casing and permit it to move by gravity out of its toasting position, and novel manually actuated means to set the mechanism for a predetermined toasting interval.

Other novel features of construction and advantage will hereinafter more clearly appear in the detailed description and the appended claims.

For the purpose of illustrating the invention I have shown in the accompanying drawings a typical embodiment of it, which, in practice, will give reliable and satisfactory results. It is, however, to be understood that this embodiment is typical only and that the various instrumentalities of which my invention consists can be variously arranged and organized, and the invention is not limited to the precise arrangement and organization of these instrumentalities.

Figure 3 is a bottom plan view of the toaster.

Figure 4 is a side elevation of the clock train seen in Figure 3, with one of the side plates removed and in inverted position.

Figure 5 is a view taken from Figure 3 in inverted position showing more clearly the manner in which the detent mechanism is constructed.

Figure 6 is a perspective view on an enlarged scale showing more particularly certain features of the clock train and its control.

Figure 7 is a detail view showing more particularly the construction for determining the toasting interval.

Similar numerals of reference indicate corresponding parts.

Referring to the drawings:—

Figure 1:
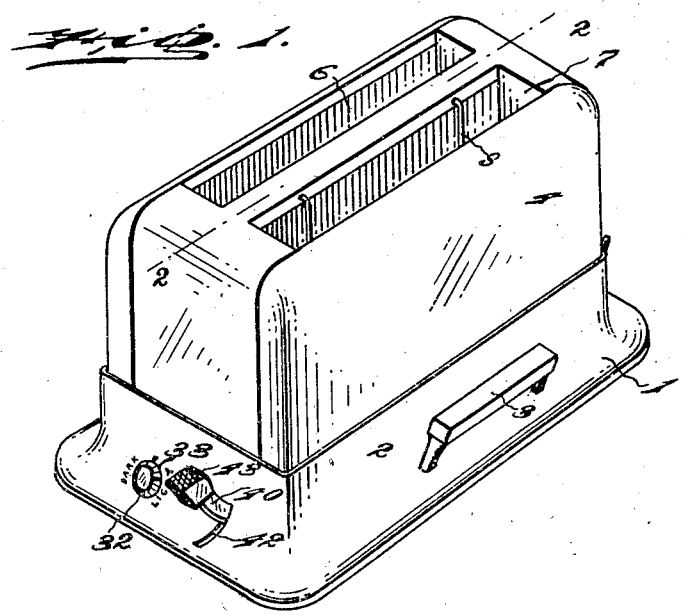
Figure 1 is a perspective view of an automatically controlled electric toaster embodying my invention.

1 designates the base of an automatically controlled electric toaster embodying my invention. The base preferably flares outwardly and is provided with an upwardly extending flange or wall 2. As illustrated, I have shown the base as being of rectangular contour but it will be apparent that it may have any desired contour in cross section. The base is preferably provided with handles 3. 4 designates the toaster casing which telescopes within the upwardly extending wall 2 of the base and is relatively movable with respect thereto.

5 designate the electric heating elements, and, as I have shown the toaster as adapted for toasting two slices of bread at a time, three of these heating elements are employed and the top of the casing 4 is provided with the slots 6 and 7 through which the toast is inserted into proximity to the heating or toasting elements. These heating elements may be constructed in any desired or conventional manner and the conventional rods 8 are provided which prevent the toast from coming into direct contact with the heating elements.

The bottom member 9 of the casing 4 has fixed to it in any desired manner, a rack 10 which meshes with a pinion 11 carried by a shaft 12 and forming part of a clock train 13. As a clock train is well known in the art I have deemed it sufficient to describe in detail only such features which are novel with me, such as, for example, the rewinding or resetting mechanism for the spring, and the manner in which the clock mechanism is controlled so that it will effect the release of the casing 4. The clock train 13 is mounted in the frame members 14 in which the shaft 12 is also mounted and this shaft 12 has fixed to it a detent member 15 in the form of an eccentric having a shoulder 16 and provided with an eccentrically disposed pin 17. The main shaft 18 has the conventional winding spring 19 and extends through a slot 20 in a detent releasing member 21 in the form of a triangular plate having a laterally deflected side 22. This plate is pivotally connected at 23 to one of the frame members 14 of the housing of the clock train. The main shaft 18 has fixed to it an arm 24 and this arm is in the path of the pin 17 so that when the casing is released and permitted to move downwardly thereby revolving the shaft 12, the pin 17 will contact with and move the arm 24 and thereby effect the rewinding of the spring 19 so that the clock train is rewound or reset.

Figure 2:
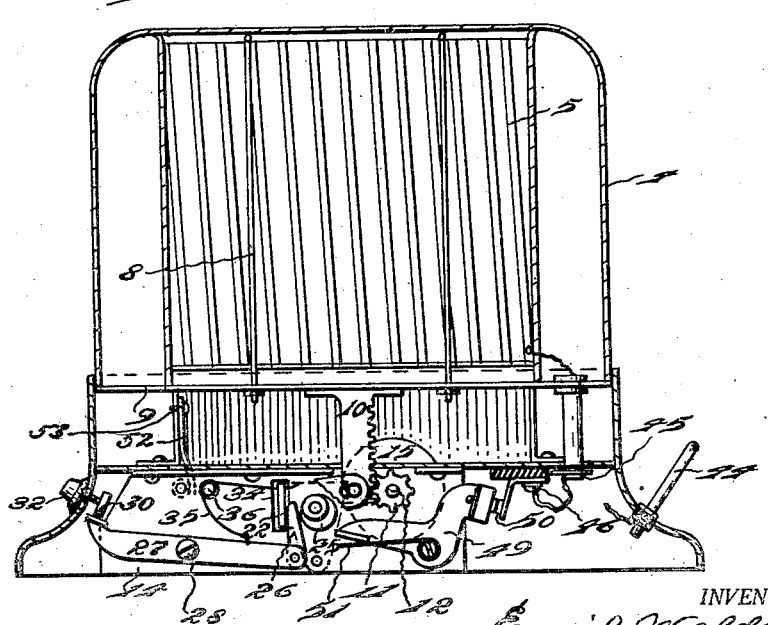
Figure 2 is a sectional elevation of the toaster, the section being taken substantially on line 2—2 of Figure 1.

The shaft 18 has fixed to it an eccentric 25 which is adapted to effect the releasing movement of the detent releasing member 21. Between the eccentric and the laterally extending flange 22 of the detent releasing member 21 is interposed a tapered arm 26 fixed to the forward end of a lever 27 fulcrumed at 28 and having its outer end laterally deflected as at 29 to form a contact portion for an eccentric 30 carried by a rod 31 which is journalled in the base and is provided with a handle 32 located exteriorly of the base as shown in Figures 1 and 2. The base in proximity to this handle is provided with the words "Dark" and "Light" on opposite sides, the base being provided with the graduation 33, and the handle 32 preferably having its marginal portion graduated. The laterally extending flange 22 extends through a slot 34 in a frame member 14, as will be understood by reference to Figure 2. A spring 35 is coiled around a fastening device 36 and one free end passes through an aperture 37, see Figure 6, in the laterally extending plate 22 of the detent releasing member 21. The opposite free end of the spring 35 bears against the lever 27 on one side of its fulcrum so that the tendency of such portion of the spring is to move the arm carrying end of the lever 27 downwardly, it being understood that the tapered arm 26 is moved upwardly by a proper actuation of the handle 32.

To effect the raising of the casing 4 into its upward position, the rack 10 is provided with a pin 38 which passes through a slot 39 in a lever 40, fulcrumed at 41, the end of the lever extending through a slot 42 in the base 1 and having its free end terminating in a pressure piece 43 which is preferably knurled.

The base is provided with the conventional prongs 44 adapted to receive the socket of an electrical connection and one of these prongs is connected with the binding post 45 while the other prong is connected with the binding post 46 of the stationary portion of the switch, the other stationary portion of the switch having a binding post 47 which is electrically connected with the binding post 48, it being understood that the binding posts 45 and 48 are electrically connected with the heating units 5.

The movable member of the switch is in the form of a lever 49, see Figure 2, which closes the circuit through the contacts 50. A spring 51 is provided which tends to move the contact lever 49 into a position to close the electric circuit, it being seen that one arm of this lever 49 is in the path of the downward movement of the rack 10 so that when the casing 4 is released and moved downwardly the electric circuit for the heating elements will be automatically opened.

The automatic control of the clock train will now be explained.

52 designates a thermostatic element, see Figures 2 and 4, one end of which is fixed as at 53 while its free end is deflected downwardly and provided with an adjusting screw 54, see Figure 4, which bears against the periphery of the balance wheel 55 of the clock train.

In electric toasters as heretofore constructed, it has been impractical to provide for the uniform toasting of the bread until the heating element has been in operation for some time. The result of this is that the pieces of bread which are first toasted are under-toasted while those later on are over-toasted, or vice versa.

In accordance with this invention, the clock train cannot start operation until a certain degree of temperature is reached which will effect the expansion of the thermostatic element 52 to remove its pressure from the balance wheel 55. As soon as this time is reached, the balance wheel 55 is released, and the clock train starts in operation. The time at which the clock train effects the closing of the circuit can be manually varied by adjustment of the handle 32 to vary the position of the eccentric 30, thereby varying the relative position of the arm 26, the eccentric 25, and the detent operating member 21. It will be apparent that, as the clock train continues to operate, the shaft 18 will revolve thereby causing the turning of the eccentric 25 which, when its effective cam area engages the tapered arm 26, will cause said arm to move towards the flange 22 of the detent member 21 thereby moving such member out of engagement with the shoulder 16 of the detent 15. This will release the rack 10 so that the casing 4 will move downwardly into its lowermost position. As this detent member moves downwardly, it will engage the free end of the contact lever 49, thereby moving said lever into its circuit opening position and effect the opening of the circuit for the heating elements.

The toasted bread now extends above the casing 4 so that its upper portion is accessible to be grasped by the operator and removed.

When it is desired to reset the toaster, the operator exerts a pressure on the portion 43 to rock the lever 40 downwardly, thereby causing the rack 10 and casing 4 to move upwardly until the detent plate 21 engages the shoulder 16 to thereby maintain the casing 4 in its raised or toasted position. As the rack 10 moves upwardly, it permits the spring 51 to cause the contact lever 49 to move into its closed position, seen in Figure 2, and effect the closing the circuit and thereby the heating of the heating elements or grids 5. It will be apparent, however, that as before explained, the clock train cannot start until the thermostat 52 is released from its engagement with the balance wheel 55.

It will be apparent that I have devised a new and useful automatically controlled electric toaster which embodies the features of advantage enumerated as desirable in the statement of the invention and the above description, and while I have in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention what I claim as new and desire to secure by Letters Patent, is:—

1. In an electric toaster, a base, a toasting element, a casing surrounding the toasting element, vertically movable with respect to said base and enclosing the bread when in toasting position, means to retain said casing above the bread during the toasting operation, and means to release the casing retaining means after a predetermined interval to permit it to move downwardly and expose the toast so that it can be grasped by the operator and removed from the toaster.

2. In an electric toaster, a base, a toasting element, a casing vertically movable with respect to said base and enclosing the bread when in toasting position, means to retain said casing above the bread during the toasting operation, means to release the casing retaining means after a predetermined interval to permit it to move downwardly and expose the toast so that it can be grasped by the operator and removed from the toaster, and a thermostat controlled by the heat from said toasting element and controlling the release of said releasing means.

3. In an electric toaster, a base, a toasting element, a casing surrounding the toasting element, vertically movable with respect to said base and enclosing the bread when in toasting position, means to retain said casing above the bread during the toasting operation, means to release the casing retaining means after a predetermined interval to permit it to move downwardly and expose the toast so that it can be grasped by the operator and removed from the toaster, and a clock train effective to release said retaining means to permit said casing to move.

4. In an electric toaster, a base, a toasting element, a casing vertically movable with respect to said base and enclosing the bread when in toasting position, means to retain said casing above the bread during the toasting operation, means to release the casing retaining means after a predetermined interval to permit it to move downwardly and expose the toast so that it can be grasped by the operator and removed from the toaster, a clock train effective to release said retaining means to permit said casing to move, and a thermostat controlled by the heat of said toasting element and controlling the release of said clock train.

5. In an electric toaster, a base, a toasting element, a casing surrounding the toasting element, vertically movable with respect to said base and enclosing the bread when in toasting position, means to retain said casing above the bread during the toasting operation, and means to release the casing retaining means after a predetermined interval to permit it to move downwardly and expose the toast so that it can be grasped by the operator and removed from the toaster, said releasing means being also effective to open the electric circuit of said toasting element.

6. In an electric heating appliance, a heating element, a switch controlling the opening and closing of an electric circuit through said heating element, a clock train effective to actuate said switch, a detent controlled by said clock train, a casing retained in raised position by said detent, said casing surrounding the heating element and when released moving downwardly to expose the article being heated, and thermostatic means controlled by the heat generated by said heating element to automatically control the starting of said clock train.

7. In an electric heating appliance, a heating element, a switch controlling the opening and closing of a circuit through said element, a clock train effective to control said switch, a detent controlled by said clock train, a casing retained in raised position by said detent, said casing surrounding the heating element and when released moving downwardly to expose the article being heated, a member driven by said clock train effective to release said detent on the termination of a predetermined time interval, and thermostatic means controlling the starting of said clock train.

8. In an electric heating appliance, a heating element, a switch controlling the opening and closing of the circuit of said heating element, a clock train effective to actuate said switch, a detent controlled by said clock train, a casing retained in raised position by said detent, said casing surrounding the heating element and when released moving downwardly to expose the article being heated, a member driven by said clock train to actuate said detent after a predetermined travel of said member, manually actuated means to vary the time at which said member cooperates with said detent, and a thermostat controlling the starting of said clock train.

9. In an electric appliance, a heating element, a switch controlling the opening and closing of the circuit of said heating element, a clock train effective to actuate said switch and having a winding spring, a detent controlled by said clock train and released on the termination of a predetermined time interval, a vertically movable casing retained in raised position by said detent and surrounding said heating element, and means to manually reset said clock train and thereby effect the rewinding of its spring and at the same time raise said casing into its raised position.

10. In an electric heating appliance, a heating element, a vertically movable casing, a carrier for the article to be heated and located in proximity to said heating element, a detent to retain said casing in raised position to surround the article on the carrier, a clock train controlling said detent and having a spring tension device for actuating it, means actuated by the movement of said carrier to effect the resetting of said spring tension device after said detent is released, and thermostatic means controlled by the heat generated by said heating element to automatically control the starting of said clock train.

11. In an electric heating appliance, a heating element, a switch controlling the electric circuit for said element, a vertically movable casing, a carrier for the article to be heated and located in proximity to said heating element, a rack connected with said casing, a pinion cooperating with said rack, a detent disc connected with said pinion, a clock train, a detent cooperating with said disc and controlled by said clock train, adjustable means actuated by said clock train to release said detent, means carried by said disc to effect the resetting of said clock train on the movement of said casing in one direction, and manually actuated means to move said casing into heating position with respect to said heating element.

12. In an electric heating appliance, a heating element, a switch therefor, an article support located in proximity to said heating element, a vertically movable casing controlling the opening of said switch on its movement out of heating position and thereby the opening of the circuit for the heating element, a clock train, a detent to retain the casing in heating position and controlled by said clock train, manually actuated means to vary the time at which said detent is released, manually actuated means to move said casing into heating position, and a spring to cause the closing of the switch when the casing is in heating position.

13. In an electric toaster, a vertically movable casing enclosing the toast when in heating position and movable downwardly when released to expose the heated article, a heating element within the casing, a detent to retain the casing in raised and toasting position, a clock train having an adjustable setting and controlling the release of said detent, and thermostatic means controlled by the heat generated by said heating element to automatically control the starting of said clock train.

14. In an electric heating appliance, a heating element, a switch controlling the circuit of said heating element, a spring for effecting the closing movement of said switch, a casing surrounding the heating element movably mounted and controlling by its movement the opening of said switch, a detent to retain said casing in heating position, a clock train to effect the release of said casing from heating position, and means to prevent said clock train from starting until a predetermined amount of heat has been generated by said heating element.

EMIL WALDER.